United States Patent
Bunce

(10) Patent No.: US 9,851,152 B2
(45) Date of Patent: Dec. 26, 2017

(54) HEAT EXCHANGER SUPPORT

(71) Applicant: ROLLS-ROYCE PLC, London (GB)

(72) Inventor: Ian Michael Bunce, Derby (GB)

(73) Assignee: ROLLS-ROYCE plc, London (GB)

( * ) Notice: Subject to any disclaimer, the term of this patent is extended or adjusted under 35 U.S.C. 154(b) by 341 days.

(21) Appl. No.: 14/593,544

(22) Filed: Jan. 9, 2015

(65) Prior Publication Data

US 2015/0204614 A1  Jul. 23, 2015

(30) Foreign Application Priority Data

Jan. 23, 2014 (GB) .................................. 1401092.0

(51) Int. Cl.
*F28D 7/02* (2006.01)
*F28D 7/00* (2006.01)
*F28F 9/013* (2006.01)
*F28D 1/047* (2006.01)
*B23P 15/26* (2006.01)

(52) U.S. Cl.
CPC ............ *F28D 7/0008* (2013.01); *B23P 15/26* (2013.01); *F28D 1/0472* (2013.01); *F28D 7/024* (2013.01); *F28F 9/0131* (2013.01); *F28F 9/0135* (2013.01); *Y10T 29/49362* (2015.01)

(58) Field of Classification Search
CPC .......... F28D 7/024; F28D 7/022; F28F 9/013; Y10S 165/414; F22B 37/205; F22B 21/26; F24H 1/16

See application file for complete search history.

(56) References Cited

U.S. PATENT DOCUMENTS

| 1,139,430 | A | * | 5/1915 | Mitchell | ................ | F22B 21/26 |
| | | | | | | 122/248 |
| 2,893,698 | A | * | 7/1959 | Nünninghoff | ......... | F22B 37/203 |
| | | | | | | 122/510 |
| 3,286,767 | A | * | 11/1966 | Evans | ..................... | F28F 9/013 |
| | | | | | | 122/510 |

(Continued)

FOREIGN PATENT DOCUMENTS

| EP | 0 049 038 A2 | 4/1982 |
| EP | 2 336 667 A1 | 6/2011 |

(Continued)

OTHER PUBLICATIONS

Jul. 25, 2014 Search Report issued in British Application No. 1401092.0.

(Continued)

*Primary Examiner* — Bradley Duckworth
(74) *Attorney, Agent, or Firm* — Oliff PLC

(57) ABSTRACT

There is disclosed herein a heat exchanger and an associated method of manufacture. The heat exchanger comprises a flow conduit for accommodating flow of a heat transfer fluid. The conduit is wound around a central axis so as to form a plurality of turns, for example in a helical fashion. A support member for the conduit is formed of a sheet material shaped to extend in a circumferential direction about the central axis, wherein the support member is common to said plurality of turns. A plurality of fasteners are arranged to attach the conduit to the support member at spaced locations along its length.

18 Claims, 4 Drawing Sheets

(56) References Cited

U.S. PATENT DOCUMENTS

| | | | | |
|---|---|---|---|---|
| 3,509,939 | A * | 5/1970 | Weber | F22B 1/16 122/510 |
| 3,545,534 | A * | 12/1970 | Coles | F28D 7/024 122/510 |
| 3,677,339 | A * | 7/1972 | Perrin | F22B 37/202 122/250 R |
| 3,700,030 | A | 10/1972 | Bosquain et al. | |
| 3,703,028 | A * | 11/1972 | Bosquain | B21D 11/06 29/281.4 |
| 4,013,402 | A | 3/1977 | Klein et al. | |
| 4,167,211 | A * | 9/1979 | Haller | F28F 9/0132 165/162 |
| 4,168,745 | A | 9/1979 | Lastinger | |
| 4,201,264 | A * | 5/1980 | Platt | F24H 1/208 162/162 |
| 4,347,433 | A * | 8/1982 | Wojtecki | B23P 15/26 165/183 |
| 4,498,524 | A * | 2/1985 | Jacobsen | F28D 7/02 165/103 |
| 4,784,219 | A * | 11/1988 | Hirschle | F22B 1/1823 165/160 |
| 4,893,672 | A * | 1/1990 | Bader | F28D 7/024 165/163 |
| 5,124,127 | A * | 6/1992 | Jones | A61M 1/1698 128/DIG. 3 |
| 5,487,423 | A * | 1/1996 | Romero | F28F 21/00 165/156 |
| 5,743,728 | A * | 4/1998 | Cloud | C04B 11/028 432/135 |
| 7,261,149 | B2 * | 8/2007 | Nail | F28D 7/022 165/159 |
| 8,042,608 | B2 * | 10/2011 | Baker | F28D 7/022 165/165 |
| 8,091,514 | B2 * | 1/2012 | Jimenez | F23J 15/06 122/20 B |
| 9,568,212 | B2 * | 2/2017 | Deivasigamani | F24H 1/165 |
| 2004/0055738 | A1 * | 3/2004 | Kauppila | F26B 3/22 165/47 |
| 2015/0184775 | A1 * | 7/2015 | Koski | F16L 3/02 248/68.1 |
| 2016/0273845 | A1 * | 9/2016 | Rizzi | F28F 9/013 |

FOREIGN PATENT DOCUMENTS

| | | |
|---|---|---|
| EP | 2 381 186 A1 | 10/2011 |
| FR | 2 314 459 A1 | 1/1977 |
| GB | 1 294 730 A | 11/1972 |

OTHER PUBLICATIONS

Jun. 1, 2015 Search Report issued in European Patent Application No. 15150436.2.

\* cited by examiner

Tube Clip 20

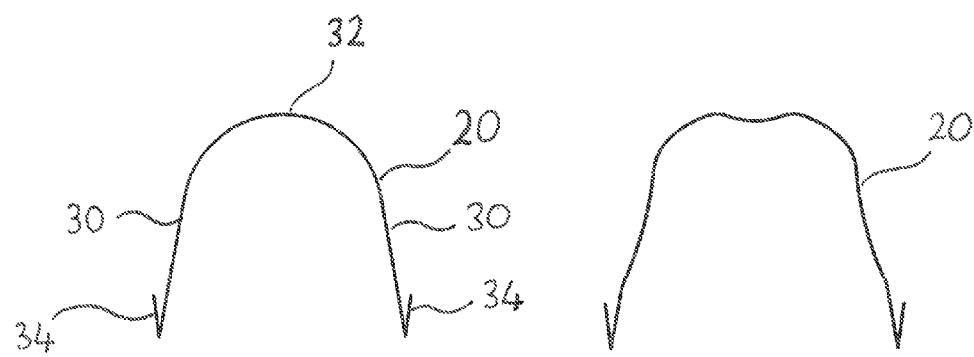
Figure 4A
Figure 4B
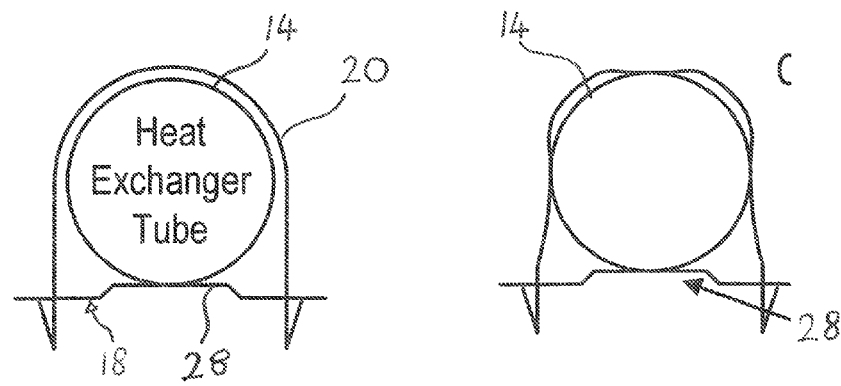
Figure 5A
Figure 5B
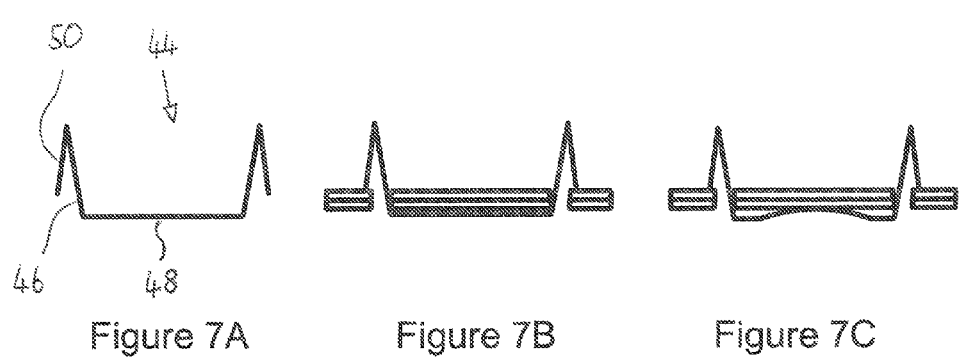
Figure 7A
Figure 7B
Figure 7C

HEAT EXCHANGER SUPPORT

The present invention relates to a heat exchanger and more particularly a heat exchanger in which one or more flow conduit is wound around an axis.

BACKGROUND

Indirect heat exchangers allow the transfer of heat energy between different mediums, whilst avoiding direct contact or mixing there-between. Either or both medium may comprise a heat transfer fluid, in which event it is common that a flow conduit such as a tube is arranged to promote heat transfer to/from the fluid over a length of the conduit.

For a number of heat exchange applications, particularly for which there are spatial constraints of the size of a heat exchanger, helical conduits may be used. Within a helical tubular heat exchanger arrangement, one or more tubes may make multiple turns about a common axis so as to provide a relatively long flow path within a relatively small volume and thereby provide a greater capacity for heat exchange than, for example a straight tube heat exchanger.

Whilst the strength of the fluid conduits may be sufficient to maintain a desired helical configuration, in use, heat exchangers experience thermal loading which can lead to fatigue over time and, accordingly, it is common to provide a support structure for the tubes. Depending on the particular application of the heat exchanger, flow-induced vibration in the tubes and/or machine induced vibration may also need to be accounted for.

A conventional support arrangement for a helical tube heat exchanger comprises a number of linear support bars at suitable locations, angularly spaced about the central axis of the helix. The bars extend in the direction of the axis (i.e. perpendicular to the direction of the tubes) and have a plurality of recesses along their length spaced to receive adjacent turns of the tubes. There are a number of problems with such an arrangement. The correct alignment of the support bars and tubes can be awkward to assemble, particularly for large/complex tube bundles. For some tube arrangements, such as an arrangement in which alternate adjacent tubes are wound in opposing directions, these problems are exacerbated and the support bar itself can be complicated and costly to manufacture.

Furthermore a bar with predetermined tube fixation points cannot accommodate variations in design and thus accepts only a fixed tube pitch and spacing. The linear supports may provide a thermal inertia which does not contribute to the heat exchanger efficiency and, particularly for thicker supports that are required to bear a large tube bundle of tubes, may adversely affect heat exchanger performance, e.g. by insulating the tube and/or prescribing a non-optimal tube spacing.

Thermal loading of the heat exchange tubes may remain a problem in a conventionally supported system due to thermal loading of the tubes relative to the discrete linear supports. A support that is optimised for strength will typically offer different thermal expansion properties to a tube and may experience different loading at its opposing ends due to its orientation relative to the tube bundle.

BRIEF SUMMARY OF THE INVENTION

It is an aim of the present invention to provide a heat exchanger which is supported in a manner that overcomes or at least partially mitigates one or more of the above problems.

According to a first aspect of the invention there is provided a heat exchanger comprising one or more flow conduit for accommodating flow of a heat transfer fluid, the one or more conduit being wound around a central axis so as to form a plurality of turns, and a support member, the support member being formed of a sheet material shaped to extend in a circumferential direction about the central axis, wherein the support member is common to said plurality of turns and a plurality of fasteners are arranged to attach the one or more conduit to the support member at spaced locations.

The support member may comprise a generally rectangular sheet material, which may be curved/arched about the central axis so as to form a generally hollow support member in use. The support member may be generally tubular in form. This shape allows a relatively thin-walled and/or compliant sheet material to be shaped in way that it can support a relatively heavy tube bundle. Furthermore, the form of the support member may ensure thermal expansion properties that are more closely matched to that of the flow conduit(s).

The support member may comprise one or more engagement formations. The engagement formations may be formed in the sheet material of the support member, for example integrally therewith. The engagement formation may comprise one or more aperture or cut-out. The engagement formations may be generally rectangular in plan.

A first type of engagement formation may be arranged to engage a fastener. The first type of engagement formation may comprise spaced formations arranged to engage spaced portions of a fastener, for example on opposing sides of a conduit. The first type of engagement formation may comprise an aperture, e.g. a simple aperture.

A second type of engagement formation may be arranged to contact an adjacent portion of the conduit. The second type of engagement formation may comprise a raised surface portion of the support member, for example providing a platform or plinth formation. The raised surface portion may or may not be generally flat. The engagement formation may be formed in the sheet, for example comprising a projection in one surface of the sheet and a corresponding recess or aperture in an opposing surface of the sheet. The engagement formation may comprise an indentation in the sheet and may be cut or pressed into the sheet.

In one example a first type of engagement formation is located adjacent a second type of engagement formation. A first type of engagement formation may be located on either side of a second type of engagement formation, e.g. such that the second type of engagement formation is located between a cooperating pair of the first type of engagements formations in use.

The fasteners may be spaced along the length of the one or more conduit. At least one fastener may attach each turn of the one or more conduit to the support member.

The fasteners may be elongate in form, for example extending substantially perpendicular to a direction of the conduit. The fasteners may be generally arched in form, for example in the manner of a strap. The fasteners may be arranged to extend around a portion of the circumference of a conduit.

The fasteners may be arranged to maintain the conduit against the support member in tension.

The fasteners may be deformable, for example the fastener may be arranged to press the conduit towards the support member in use. The fasteners may or may not be contractable. Each fastener may be actuable between an at-rest condition and a deformed condition in which the fastener applies a greater contact force between the conduit and support member. Deformation of the fasteners may be heat actuable.

The fasteners may comprise a shape memory material, such as a shape memory allow.

Each fastener may comprise a non-return formation at one or both ends thereof. The non-return formation may be insertable through a formation in the support member in a first direction but may resist removal in the opposing direction. The non-return formation may comprise a barb or acute fold in the fastener material.

Each fastener may be arranged to engage with the support member in a clip fit or snap fit engagement. A portion of the fastener may be reversibly deformable during engagement with the support member.

The support member may comprise a plurality of openings therein. A regular array of openings may be provided over the area of the support member, e.g. over a face thereof. The openings may be circular. The openings may be provided between fastener and/or engagement formation locations (e.g. being separate from the formations/apertures used for attachment of fasteners. The openings may comprise cut-outs or windows in the sheet material of the support member.

A support member may be arranged adjacent, e.g. immediately adjacent and/or abutting, a radially inward or outward side of the one or more conduit relative to the central axis. The heat exchanger may comprise a plurality of rows of conduits. Each row may comprise a plurality of turns about the central axis. Each row may be arranged radially inwardly or outwardly of an adjacent row relative to the central axis. A support member may be located between each adjacent row.

The fasteners may comprise a thin-walled material, for example which may be of a similar wall thickness to that of the support, e.g. having a wall thickness of the same order of magnitude.

According to a second aspect of the invention, there is provided a method of manufacturing a heat exchanger comprising shaping one or more fluid conduit to extend in a helical direction around a central axis for a plurality of turns, and forming a support member from a sheet material shaped to extend in a circumferential direction and arranging the support member adjacent the fluid conduit about the central axis such that the support member extends in the direction of the central axis for said plurality of turns of the fluid conduit, and fastening the conduit to the support member at spaced locations along the length of said one or more conduit (e.g. using a plurality of fasteners at spaced locations).

The fasteners may be relatively loosely attached during assembly of the heat exchanger. The fasteners may be self tightening in situ or in use.

The method may comprise arranging and/or fastening a first support member against a first conduit row and subsequently arranging and/or fastening a second support member against a second row. The method may be repeated for a plurality of rows of conduits in order based on an ascending or descending radial dimension. Each row and corresponding support member may be added in succession. The first row may be a radially innermost row. The first support member may be located radially inside the first row.

The method may comprise defining an overlap between opposing ends of the support member and fastening said overlapping portions together.

According to a third aspect of the invention there is provided a support system for use with the heat exchanger of the first aspect.

According to a fourth aspect of the invention there is provided a support system for a heat exchanger comprising: a support member formed of a sheet material and shaped to extend in a circumferential direction about a central axis, wherein the support member extends in the direction of the axis by a length sufficient to accommodate a plurality of turns of a helical flow conduit adjacent a surface of the support member in use and the support member comprises a plurality of engagement formations arranged to support the plurality of turns of the flow conduit at spaced locations.

Wherever practicable, any of the essential or preferable features defined in relation to any one aspect of the invention may be applied to any further aspect. Accordingly the invention may comprise various alternative configurations of the features defined above.

BRIEF DESCRIPTION OF THE DRAWINGS

Practicable embodiments of the invention are described in further detail below by way of example only with reference to the accompanying drawings, of which:

FIGS. 4A and 4B show an example of a fastener prior to use and in-use respectively;

FIGS. 5A and 5B show section views through a conduit once assembled using the fastener of FIGS. 4A and 4B;

FIGS. 7A, 7B and 7C show respective section views of a support member fastener before, during and after assembly of the support member.

DETAILED DESCRIPTION

Figure 1:
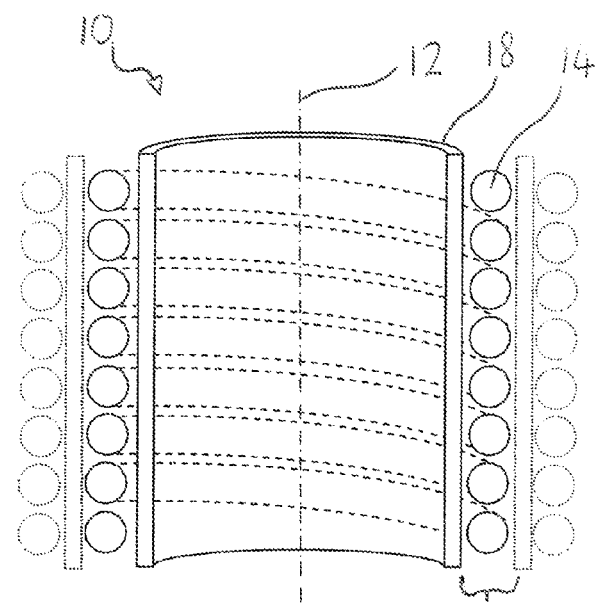
FIG. 1 shows a schematic section view through a heat exchanger.

Turning firstly to FIG. 1, a portion of a heat exchanger 10 is shown in section relative to a central axis 12. In this example, a flow tube 14 is wound a number of times about the axis 12 in a helical fashion such that each turn is spaced from an adjacent turn in the direction of the central axis 12. FIG. 1 represents a simplified example in which only a single row of turns is provided. However in other examples, multiple rows 16 of turns may be provided by one or more conduits, with each row being aligned about the central axis but radially outside of the previous row, as shown in phantom at the outside edges of FIG. 1.

A tube support structure 18 is provided in order to hold the turns of the flow tube at the desired spacing an orientation. The support structure comprises a metal sheet which is generally rectangular in form and which is deformed about the central axis 12 so as to form a hollow body of revolution, e.g. a tube. In other embodiments, it is feasible that the support 18 could be shaped to match other profiles of tubes wound about the axis, such as elliptical or even polygonal shape in plan.

In the example of FIG. 1, it can be seen that the support 18 is provided immediately adjacent and radially inside the helically wound tube 14. However in other embodiments, and perhaps more typically, the support will surround the tube 14 at its radially outer periphery as will be described below. Also shown in FIG. 1, a support 18 is provided in respect of each tube row 16, although it is possible that in other examples a single support 18 could sufficiently hold multiple rows, such as for example with a row being supported by both a radially inner and outer face thereof.

The helical tube support solution presented herein is capable of significant customisation to accommodate different heat exchanger design requirements. This submission assumes a plurality of helical tubes assembled in discrete rows, with the bundle assembled from the outer row towards the inner row or vice versa. It will be appreciated that the tube diameter, the helix angle, the tube bundle height, the number of rows and the pitch of the tube rows are engineering variables that could be changed in accordance with standard engineering practice to optimise heat exchange and such variable are not discussed herein in further detail.

Figure 2:
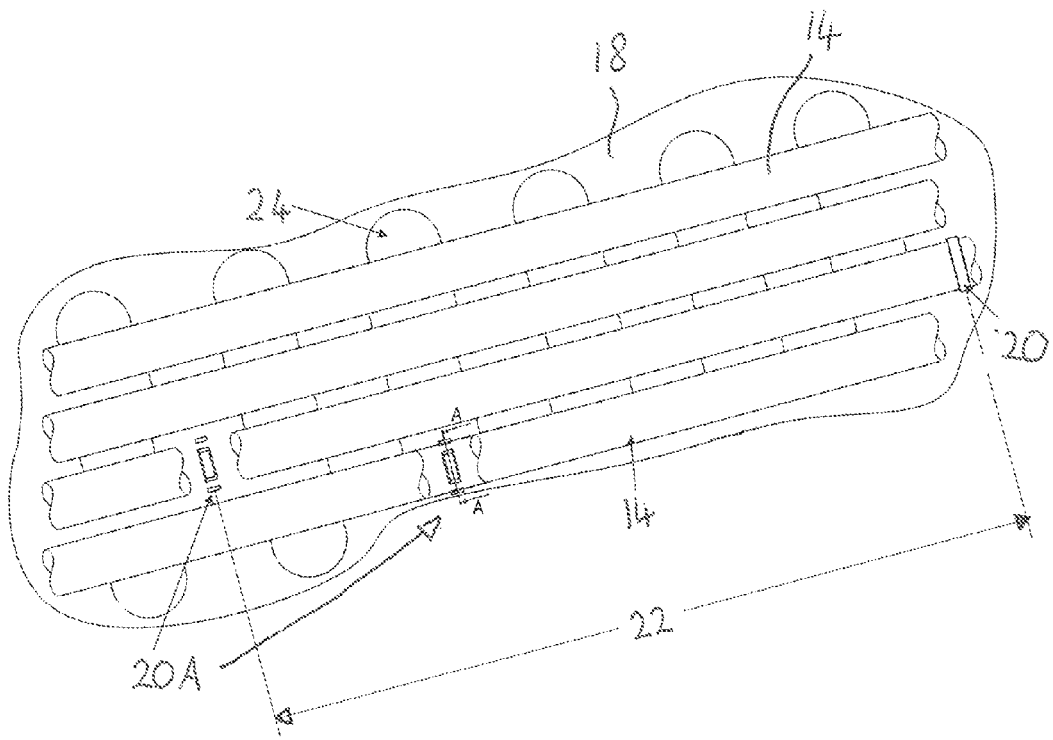
FIG. 2 shows a side view of portion of a row of conduits.

FIG. 2 shows a partial side view on a helical tube row, looking from the inside diameter toward the outside diameter.

The tube support 18 comprises a sheet wrapped around the extrados of the helical tube row. It is envisaged that the row of tubes will be installed before introducing the tube support. Tubes 14 are affixed to the tube support 18 using fasteners in the form of clips 20 depending radially inwardly from the support 18, examples of which will be described below. The concept can be reversed with the tube support wrapped around the intrados of the helical tubes and clipped from the outside diameter.

A fundamental principle of the present disclosure is that heat exchange tubes are clipped to a sheet support system so as to provide a common support for all tubes in a row, rather than using discrete tube support bars. A single tube clip 20 is shown in FIG. 2 and the location of a further clip 20A has been exposed to show the underlying features of the support 18 as will be described below in relation to FIG. 3A.

A dimension labelled 22 represents the distance between fasteners along a common tube, i.e. the 'clipping pitch'. It is envisaged that the clipping pitch will be constant for each tube 14 and possibly for all tubes in the tube bundle and will typically, although not essentially include at least one clip per turn of each tube. is However the number of tube clips can be generally varied as needed to provide adequate tube support whilst avoiding use of too many clips in a way that could significantly impede heat exchanger performance. The currently proposed tube clipping method allows the tube support length to be customised to suit both the heat exchanger design and idealised tube support such that a designer of a particular heat exchanger configuration has freedom to determine the optimum tube support length.

In FIG. 2 there are also shown a number of openings in the form of through holes 24 in the support sheet 18. The openings 24 are separate from, and typically larger than, the apertures for attaching the tubes to the sheet as will be described below. The openings are provided to permit fluid flow across the tube support sheet, and thus prevent significant thermal gradients developing across the heat exchanger (e.g. to reduce the thermal inertia of the support 18). The optimum dimensions and form of these openings may vary between different engineering applications and allow significant customisation to ensure that fluid flow is optimised to minimise pressure drop through the tube bundle whilst maximising heat transfer.

It is proposed that the openings 24 will be formed by stamping or cutting (e.g. laser or water jet cutting). Regardless of the method of formation, it is proposed that the openings 24 will be arranged in a substantially regular array over the area of the support 18. The openings may occupy up to approximately half of the area of the sheet, thereby allowing sufficient remaining area to which the heat exchange tubes can be mounted.

Figure 3A:
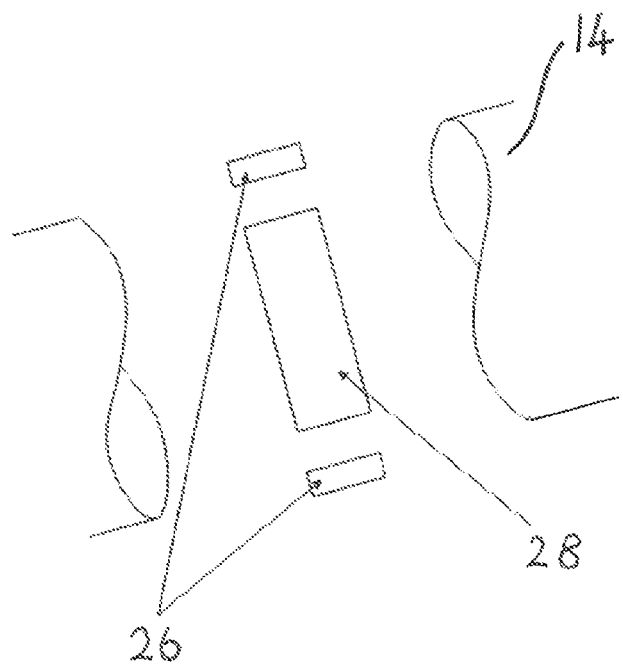
FIG. 3A shows a detailed side view of a portion of FIG. 2 with the conduit partly cut away to reveal the support member beneath.

FIG. 3A shows a closer view on a single tube clip location with part of the tube removed and the tube clip omitted for clarity. Features in the tube support to accommodate each tube clip/fastener comprise two apertures 26, each arranged towards an opposing side of the tube 14 (i.e. on opposing sides of a longitudinal axis of the tube). The apertures are rectangular in plan in this embodiment.

Between the apertures is provided a raised surface portion 28 of the support. The raised portion is generally rectangular in plan and may be in the form of a plinth. This raised portion holds the tube slightly above the surface of the remainder of the support (i.e. to maintain an air gap therebetween).

Whilst it would be possible to provide the raised surface feature 28 using a number of different methods, it is anticipated that both the raised surfaces 28 and apertures 26 could be formed by stamping/pressing. Where the apertures are formed as through holes, the raised portion 28 may be formed as an indentation. It may be partially cut, e.g. on opposing sides thereof. In other embodiments it is possible that the apertures could be produced by cutting, e.g. water jet or laser cutting. The indentation of the raised portion 28 is beneficial in that it allows a support sheet to be of simple construction, having substantially uniform wall thickness.

It is anticipated that the raised surface will be approximately 2 mm above the remainder of the support surface, such that the helical tubes will not be in contact with the support for any significant length of the tube. For example, the width of the raised support portions 28 may be less than 15 mm or 10 mm. Avoiding such contact has a number of perceived benefits, including improved heat transfer, reduced potential for corrosion and build-up of corrosion products and optimised performance against fretting wear. The exact height of the raised surface may be altered according to detailed design analysis. In an alternative embodiment, it is to be noted that the apertures 26 could be configured to be part of the raised surface 28.

The apertures 26 and raised portion 28 provide a single tube engagement formation, which formation is repeated over the surface of the support sheet at suitable locations according to the clipping pitch and tube spacing. A cyclic repeating pattern/array of engagement formations may be provided.

Figure 3B:
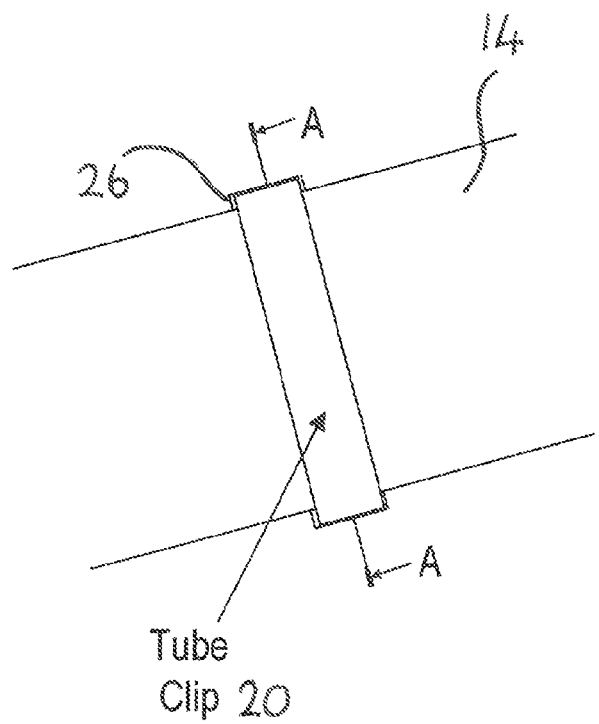
FIG. 3B shows the equivalent view of FIG. 3A with the conduit and fastener assembled for use.

FIG. 3B illustrates a tube clip 20 in position. Partial views on section AA of FIG. 3B are shown in FIG. 5. An example of a tube clip 20 will be described in further detail below.

FIG. 4A illustrates the form of a tube clip 20 prior to installation. The clip is generally strap-like in shape, taking the form of an elongate band of material. In FIG. 4A, prior to installation, the clip 20 is shaped to pass around a tube 14. The clip is generally arched, e.g. in the form of a U-shape having two generally straight sides 30 and a curved intermediate portion 32.

The opposing ends of the clip 20 comprise barb-like formations 34. In a simple embodiment, the barbs 34 are formed by folding a length of the clip back upon itself so as to form an acute internal angle, i.e. a tapered or pointed end. One or both ends may be provided with a barb, non-return formation. A non-barbed end may be provided with an alternative end stop formation for engagement with the support, such as a blunt end or foot formation, e.g. formed as a perpendicular bend in the clip.

The clip 20 comprises a metal material. In this particular example, the clip is formed of a shape memory alloy such that it adopts a first form in an initial state (i.e. a martensitic phase) but is deformed to an alternative shape upon heating (i.e. an austenitic phase).

FIG. 4B shows the form of the clip 20, manufactured from shape memory alloy, after manufacture from strip and appropriate annealing. The form illustrated in FIG. 4A is achieved by plastic deformation of the clip shown at FIG. 4B.

In use the clip is deformed as shown in FIG. 4B so as to cause the clip to depend inwardly at one or more locations along its length. In this embodiment the clip deforms to form a protrusion (e.g. a bowed shape) on its opposing sides 30 as well as within the intermediate portion 32.

Suitable shape memory alloys, manufactured from Nickel and Titanium, exist; with a transformation temperature just less than 100° C. Thus, for a heat exchanger designed to operate with water up to boiling point (for example, a steam generator), the tube bundle can be assembled at room temperature and become rigid at operating temperature.

A method of assembling a helical tube bundle involves forming the desired wound tube row 16 and then placing the circumferential support 18 adjacent the tube row. Once correctly aligned, the tube row 16 is fastened to the support by applying clips 20 over the relevant portions of the tube row such that they engage with the corresponding engagement formations of the support.

In the example of FIGS. 2-5, this is achieved by inserting the barbed ends 34 of the clip 20 through the engagement apertures 26. The aperture 26 through which the end 34 is pushed during fitting may be smaller than the dimension over the barb. Thus, as the clip is pushed into position, the barb elastically deforms and springs back into position once the barb has passed fully through the respective aperture 26. The barb end prevents return passage of the clip by contact with the opposing surface of the support, thereby resisting loosening or release of the clip. The spacing of the apertures 26 may be slightly less than that of the clip ends, whereby the clip is deformed slightly during insertion into the apertures 26 (i.e. by squeezing the ends of the clip together) such that it is held in tension on the support to further avoid release of the clip.

Once mounted as described above, the tube 14 rests on the raised portions 28 of the support so as to maintain minimal thermal contact with the support.

Although no dimensions are given, the clip 20 is sized to ensure a clearance fit when assembled with a helical tube upon the cylindrical tube support 18 as shown in FIG. 5A. Thus the tube 14 is initially loosely held in place relative to the support, for example limiting the freedom of movement of the tube row but not fully supporting the weight of the tube row on the support 18.

When the clip is heated, the clip adopts a shape that more tightly constrains the tube 14 against the support 18 according to the shape memory of the clip material, for example by hoop stress in the clip. The shape of the clip in FIGS. 4B and 5B ensures four point contact with the tube when at elevated temperature. This minimises the surface contact between the clip and the tube, with attendant benefits for fretting and build-up of chemicals. The points of contact are substantially evenly spaced about the circumference of the tube. In this example, three points of contact are made by the clip. A three point contact variant could also be used, whereby only two points of contact are made by the clip.

A small amount of permanent set is assumed, to provide assurance that the clip will 'spring' into position when fitted and retain this position through life. Although no specific clip dimensions are admitted, the length to which the barb end protrudes through the tube support sheet 18 is such that there is no interference with tubes in an adjacent tube row on the opposing side of the support sheet 18.

FIGS. 5A and 5B are section views through the plane A-A of FIG. 3B illustrating a tube clip assembly, with FIG. 5A representing the condition after installation but before operation. FIG. 5B illustrates the after heat transformation has occurred, e.g. in use. As the heat exchanger reaches operating temperature for the first time (probably during pre-commission testing), the tube clips will pass through their transformation temperature and revert to their annealed shape, whereby the tube is permanently clamped onto the support. The tube clip and tube support sheet specifications are such that a tube bundle can be assembled and checked with relative ease. The intention is that a spring load will be created to keep the tube in contact with the tube support sheet and the tube clip for all normal operating conditions. Depending on the engineering application for the heat exchanger, the clips may or may not be reversibly deformable.

With care, the design of the return features on the tube clips will allow a degree of overload and thus prevent tube clip failure for unforeseen events and accidents.

In some embodiments, temporary additional support may be provided to hold the tube support sheet 18 in position whilst tubes in a tube row are clipped. Once all tubes are fastened to the tube row there will be sufficient rigidity in the assembly to release any temporary supports and move on to the next tube row. Once each row of the tube bundle is assembled, the tube support system will be entirely self-supporting with no connections necessary to other parts of the heat exchanger structure (for example, headers or shell). Thus, the tube support structure will not be subject to loading from, or cause loading of, any other part of the heat exchanger.

Figure 6:
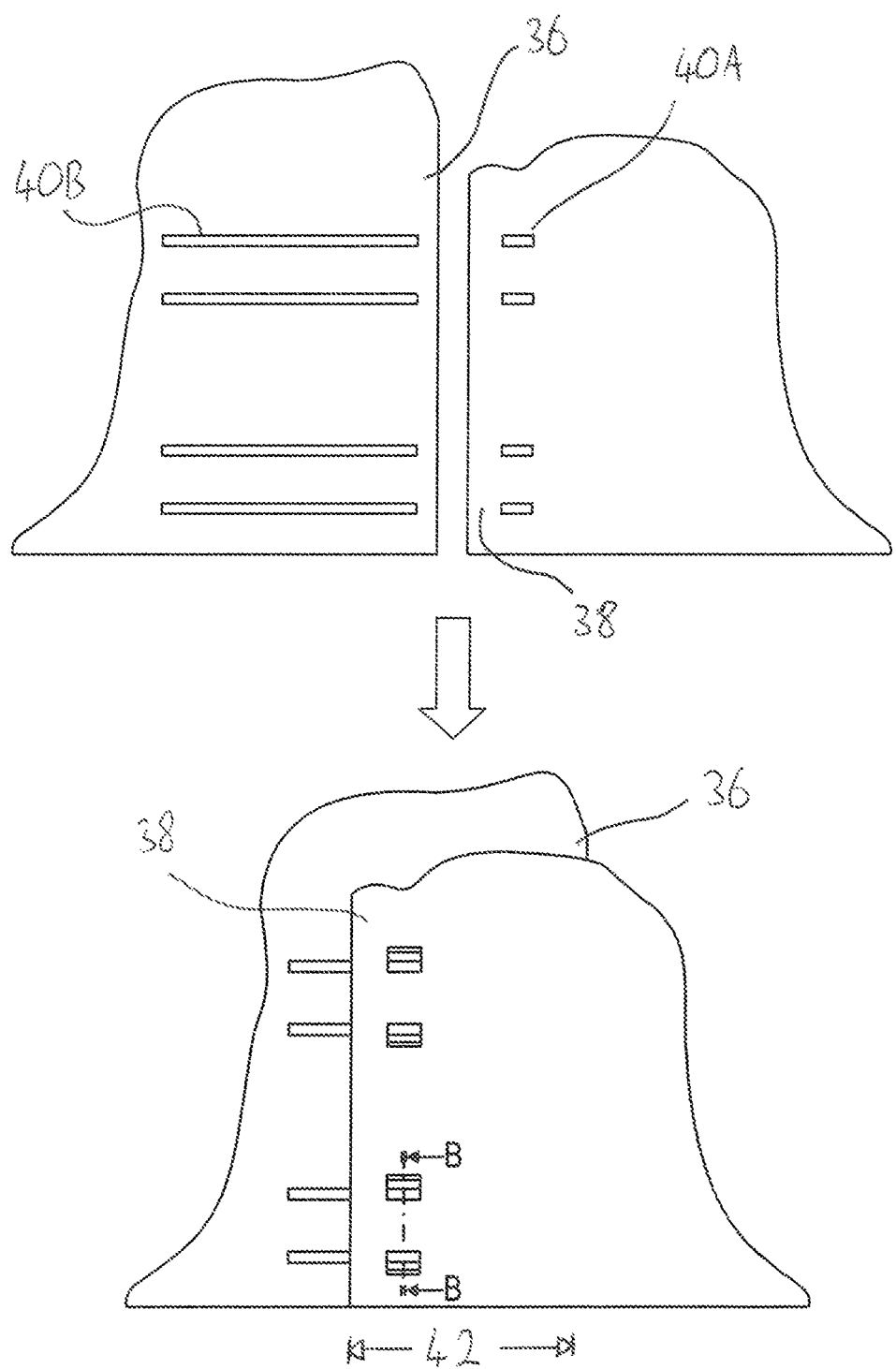
FIG. 6 shows a stage of the assembly of the support member.

FIG. 6 is a partial view illustrating one possible method for creating the desired shape of the tube support sheet 18 and holding it in place whilst the helical tubes 14 are clipped to the tube support sheet. In this example, the support sheet 18 is deformed about the central axis 12 shown in FIG. 1 by bringing opposing ends 36, 38 of the support together such that they form an overlap. Each end 36, 38 comprises alignment apertures 40 at common spacings from an outer edge 42 of the support and/or from adjacent apertures 40. In this example, the apertures 40A in end 38 are of relatively short length, whereas the apertures 40B in end 36 are of relatively long length, i.e. being elongate in form.

The apertures 40 in this example are provided in pairs, i.e. to accommodate the opposing ends of a common clip 44 to be described below.

The long apertures allow the size of the support to be range-taking such that the ends can be fastened at a desired point along length of slot 40B to define the size of the support once erected. As shown in FIG. 6, the length of the overlap 42 may be varied accordingly. This may allow a common support design to cover a number of different tube rows/sizes. The manner in which the support ends can be fastened is described below with reference to FIG. 7, which shows three partial views on plane B-B defined in FIG. 6, i.e. at the interface between the overlapping ends of the support.

The method of securing the ends of the tube support sheet described here uses clips 44, for example in a manner similar to the securing of the helical tubes to the support 18. The clips are arranged to pass through the apertures 40A and 40B in both ends of the support to thereby fasten the overlapping portions together. These clips 44 may be similar in premise to those described above in that they may be formed of a band of material shaped to define opposing sides 46 with an intermediate portion 48 there-between. The ends of the side walls have non-return formations in the form of barbs 50 as described above. However the intermediate portion 48 in the present example may be substantially flat, rather than curved as shown in FIG. 4A.

During erection of the support, the non-return ends 50 are inserted through aligned apertures 40A, 40B in the opposed, overlapping ends 36, 38 of the support sheet. Thus the intermediate portion 48 of the clip rests against an outer surface of one end 38 and the non-return ends 50 abut against the opposing outer surface of the other end 40 of the support. The clip may be formed of a shape memory alloy, such that it can deform to apply compression between the overlapping ends of the support as shown in FIG. 7C. In that example, the intermediate portion 48 has bowed inwardly, towards the ends 50 during change to its austenitic phase so as to press the intermediate layers of the support against the non-return ends 50. Whilst this type of fastener does offer benefits in speed of assembly, etc it is feasible that a more conventional fastener for erection of the support could be used in place of clip 44.

The overlap between the ends of the support sheet 18 is designed to accommodate manufacturing and build tolerances, pressure loading of the helical tubes and thermal expansion of the helical tubes and tube support sheet.

One intent with the embodiments described above is to significantly simplify the assembly of a heat exchanger when compared to the prior art. The thin-walled support sheet achieves improved strength characteristics by shaping it to curve about the central axis 12 of the tube bundle. Helical tubes are clipped to a cylindrical tube support sheet using clips manufactured from shape memory alloy. On completion of assembly, the tube bundle will not be rigid. As the tube bundle warms up, thermal expansion and reshaping of the shape memory alloy clips will cause the whole assembly to become more rigid.

A number of tube rows of the heat exchanger can be built up sequentially from the outermost row inwards or else from the inner row outwards. Each row can be easily inspected before proceeding to the next.

The direct fastening of the heat exchanger tubes directly to the support sheet is quick and allows significant customisation of the support structure. When assembled, the cylindrical tube support system will be self supporting; with no structure attached to the tube headers or the heat exchanger shell (eliminating a stress engine). Furthermore, the use of a tubular sheet to support the tubes permits significant customisation of fluid flow through the tube bundle, with the possibilities of encouraging either cross bundle/row flow or linear bundle flow, depending on which generates the best compromise between fluid flow and heat transfer.

The avoidance of welds throughout the support structure can simplify manufacture and improve reliability in use. Furthermore the present disclosure provides the ability to accommodate more intricate tube bundle designs that may not have hitherto been possible due to the complexity of assembly.

The described embodiments are intended to accommodate a steam heat transfer environment as may be required in a machine in which steam is used as a working fluid and/or heat transfer fluid. One particular application for the described embodiments would be within a helical coil nuclear steam generator, although a number of other helical coil heat transfer application are envisaged as being suitable for a wide range of machines in which excess heat is generated, such as combustion engines, generators and the like.

The invention claimed is:

1. A heat exchanger comprising:
one or more flow conduits for accommodating flow of a heat transfer fluid, the one or more conduits being wound around a central axis so as to form a plurality of turns,
a support member, the support member being formed of a sheet material shaped to extend in a circumferential direction about the central axis, wherein the support member is common to said plurality of turns; and
a plurality of fasteners made of shape memory alloy and arranged so as to attach the one or more conduits to the support member at spaced locations, wherein each shape memory fastener is configured to adopt a first form at a first temperature and a second form at a second temperature.

2. A heat exchanger according to claim 1, wherein the support member is generally tubular in form.

3. A heat exchanger according to claim 1, wherein the support member comprises a plurality of engagement formations for engagement with the fasteners and/or conduits at a plurality of locations along the length of the conduit.

4. A heat exchanger according to claim 3, wherein the engagement formations are integral with the support member.

5. A heat exchanger according to claim 3, wherein the engagement formations each comprise an aperture and/or raised surface portion of the support member.

6. A heat exchanger according to claim 3, wherein each engagement formation is arranged to maintain the conduit spaced from the surface area of the support member.

7. A heat exchanger according to claim 6, wherein a conduit contacting portion of each engagement formation is disposed between adjacent fastener engaging portions of the engagement formation.

8. A heat exchanger according to claim 1, wherein each fastener is arched in form.

9. A heat exchanger according to claim 1, wherein each fastener has a non-return formation to prevent disengagement or loosening of the fastener once engaged with the support member.

10. A heat exchanger according to claim 1, wherein each fastener is deformable in situ to increase a restraining force between the conduit and support member.

11. A heat exchanger according to claim 1, wherein the support member comprises a plurality of flow openings to allow heat transfer between opposing sides of the support member in use.

12. A heat exchanger according to claim 1, wherein the one or more conduits comprise a conduit bundle having a plurality of conduit rows therein, wherein each conduit row follows a substantially helical path around the central axis.

13. A heat exchanger according to claim 12, comprising a plurality of support members, wherein a support member is provided radially internally or externally of each row relative to the central axis.

14. A heat exchanger according to claim 1, wherein the support member defines a body of revolution about the central axis and has a length dimension in the direction of said central axis.

15. A method of manufacturing a heat exchanger comprising:
shaping one or more fluid conduit to extend in a helical direction around a central axis for a plurality of turns;

forming a support member from a sheet material shaped to extend in a circumferential direction;

arranging the support member adjacent the fluid conduit about the central axis such that the support member extends in the direction of the central axis for said plurality of turns of the fluid conduit; and fastening the one or more conduit to the support member at spaced locations along the length of said one or more conduit with the use of fasteners, wherein each of the fasteners comprises shape memory material that adopts a first form at a first temperature and a second form at a second temperature.

16. A method according to claim 15 further comprising forming the support member of a generally rectangular sheet material and shaping the support member to form a curved profile about the central axis.

17. A method according to claim 15 further comprising fastening the one or more conduit to the support member using fasteners during assembly of the heat exchanger, wherein the fasteners are tightenable in use.

18. A method according to claim 15 further comprise arranging and/or fastening a first support member against a first conduit row and subsequently arranging and/or fastening a second support member against a second conduit row.

* * * * *